United States Patent [19]
Starozhitsky et al.

[11] Patent Number: 5,975,569
[45] Date of Patent: Nov. 2, 1999

[54] HEAT TREATED COMBUSTION CHAMBER HOUSING AND PROCESS FOR MAKING SAME

[75] Inventors: Michael Starozhitsky, Buffalo Grove, Ill.; Edward Kawecki, Southbury, Conn.

[73] Assignee: Illinois Tool Works, Glenview, Ill.

[21] Appl. No.: 08/963,150

[22] Filed: Nov. 3, 1997

[51] Int. Cl.$^6$ .................................................. B60R 21/26
[52] U.S. Cl. .......................................................... 280/741
[58] Field of Search ................................ 280/741, 736; 102/530, 531

[56] References Cited

U.S. PATENT DOCUMENTS

| | | | |
|---|---|---|---|
| 4,938,501 | 7/1990 | Wipasuramonton | 280/741 |
| 5,197,756 | 3/1993 | Jarboe et al. | 280/741 |

*Primary Examiner*—Paul N. Dickson
*Attorney, Agent, or Firm*—Welsh & Katz, Ltd.; Thomas W. Buckman, Esq.

[57] ABSTRACT

A combustion chamber housing for use in an airbag deployment system has a tubular body portion having a length and defining a combustion chamber that is adapted to contain combustion materials and to contain gases produced from the combustion thereof. The body has an expanded region having an edge defining an opening. The edge and a portion of the body adjacent to the edge and extending longitudinally therefrom along the body is heat-treated and defines a heat-treated, strengthened region. A method for heat treating the housings is also disclosed.

7 Claims, 1 Drawing Sheet

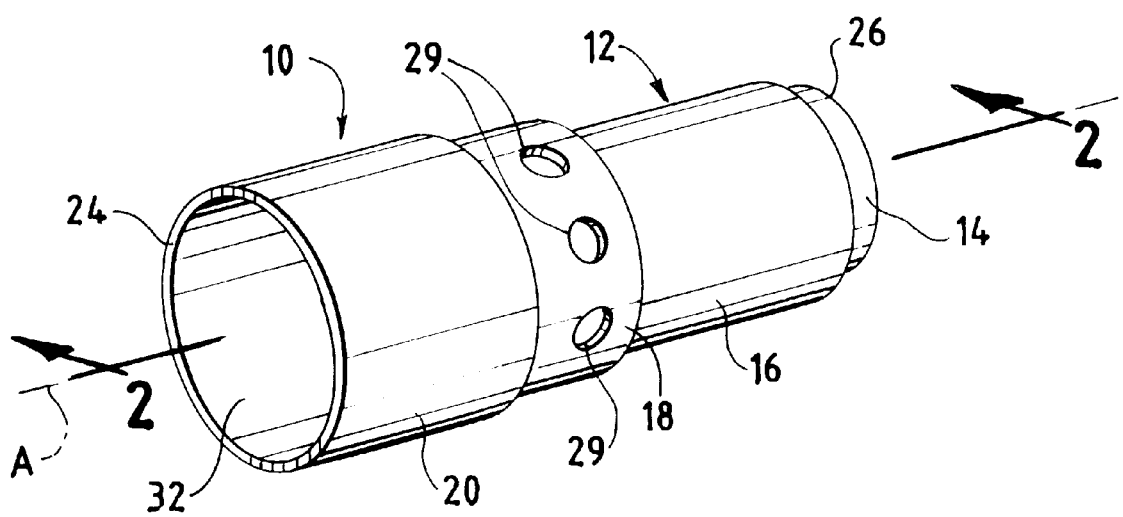
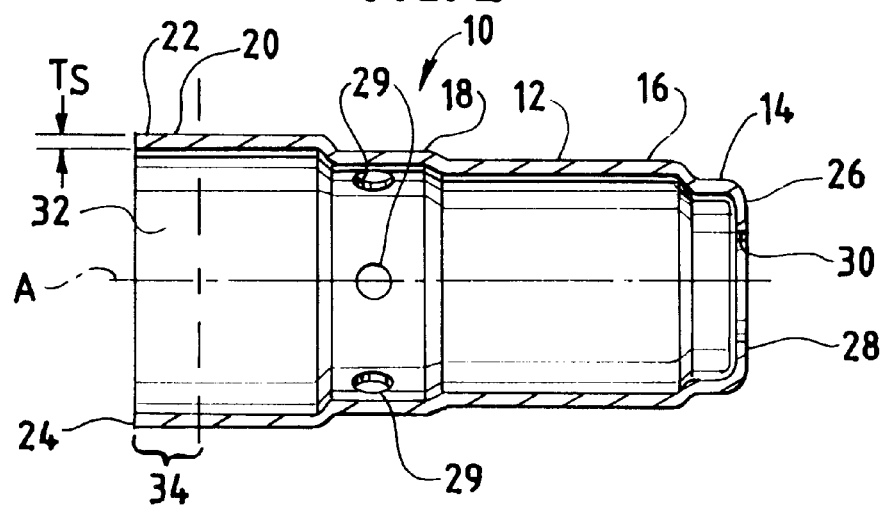

HEAT TREATED COMBUSTION CHAMBER HOUSING AND PROCESS FOR MAKING SAME

FIELD OF THE INVENTION

This invention pertains to combustion chamber housings having a portion of the housing heat-treated after formation, and a method for making such partially heat-treated housings. More particularly, the invention pertains to combustion chamber housings for use in automobile airbag deployment systems having a heat treated, strengthened region, and a process for making such housings.

BACKGROUND OF THE INVENTION

Supplemental restraint systems or airbags have quickly become an important safety feature in automobiles today. Current airbag deployment technology uses controlled combustion or an "explosion" to rapidly deploy the airbag. The chemicals that create this controlled explosion are housed in a chamber or housing.

In order to assure proper airbag deployment, the chemicals and the subsequent combustion must be contained within the chamber in such a manner as to assure complete, controlled and predictable combustion within certain given parameters. One requirement to meet such a set of given parameters is the structural integrity of the combustion chamber. That is, the chamber must be configured and fabricated such that it maintains its integrity through the combustion process and subsequent airbag deployment.

One known chamber configuration includes a substantially tubular member having an open end and an opposing, partially occluded end. The chamber expands in a step-wise manner from the partially occluded end to the fully open end. The open end of the chamber is that portion of the chamber that is at the largest diameter of the chamber, and is subsequently mounted to another component of the airbag assembly.

In a typical manufacturing process for the chamber, the chamber is formed from common carbon steel materials, such as American Iron and Steel Institute (AISI) 1006 to 1008. The steel is cold drawn to form the various requisite step-wise expansions in the housing body.

It has been observed that in order to assure structural integrity of the chamber, the thickness of the steel must be substantial, about 0.062 gauge. It has also been observed that at relatively low temperatures during impact testing, the chamber can split or fail at particular points along the chamber body. Specifically, the chambers have been observed to fail from an edge of the open end, longitudinally along the chamber body.

Microscopic examination of the failed samples has shown that the grain structure of the steel elongates in the direction of drawing, and that cracks in the chamber tend to propagate along the elongated grain boundaries. As a result of the weakened grain structure, the cracks tend to grow substantially longitudinally along the chamber body.

It is believed that failure of the combustion chambers during testing is due, in part, to stress cracks that are induced in the edge of the material as a result of drawing. Specifically, cracks develop at the edge and propagate, along the elongated grain boundaries, in the direction in which the steel is drawn.

One method to alleviate the cracking problem that has shown some success is to machine the edge of the chamber housing body to remove the cracks. Although this method has been somewhat successful in reducing cracking in the housing, it requires considerable time and is a labor-intensive and thus costly effort.

Accordingly, there continues to be a need for a combustion chamber housing having a high degree of structural integrity which chamber is formed from relatively common carbon steel materials. Further, there continues to be a need for a method for forming such housings, which method uses efficient and cost-effective parts and processes for manufacturing the housing.

SUMMARY OF THE INVENTION

A combustion chamber housing for use in an airbag deployment system has a tubular body portion having a length and a longitudinal axis. The body portion defines a combustion chamber that is adapted to contain combustion materials and to contain combustion gases produced therefrom. The body has an expanded region that defines an edge. The edge and a portion of the body adjacent to the edge and extending longitudinally along the body define a heat treated, strengthened region.

Typically such housings are cold drawn from common carbon steel materials. The cold drawing process tends to elongate and weaken the grain structure in the direction of drawing. Heat treating the portion of the combustion chamber housing adjacent to the edge reduces the tendency for crack propagation along the grain boundaries by reforming or recrystallizing the grain structure. Heat treating thus provides desirable crack resistant properties that otherwise result from the elongated grain structure.

In a preferred embodiment, the housing includes a plurality of step-wise expanding regions, the largest of which defines an expanded region for mounting the housing to other assemblies of the airbag deployment system. Preferably, the heat-treated, strengthened region is coextensive with the expanded region. Alternately, the heat-treated, strengthened region has a length that is smaller than the length of the expanded region.

A method for making the combustion chamber housing includes forming the housing, and trimming a portion of the chamber housing at about the edge. A portion of the housing extending longitudinally along the body from the edge is heat-treated. In a preferred method, heat treatment is affected by a heat induction process. The housing can be cooled by liquid quenching, or preferably, by air-cooling.

Heat treatment is preferably conducted at a temperature of between about 1500° F. and about 1700° F., and most preferably at a temperature of about 1650° F. Preferably, the housing is heat treated for between about 3 seconds and 8 seconds, and most preferably for about 4 seconds to about 6 seconds.

Other features and advantages of the present invention will be apparent from the following detailed description, the accompanying drawings, and the appended claims.

BRIEF DESCRIPTION OF THE FIGURES

FIG. 1 is a perspective view of an exemplary combustion chamber housing that has been heat treated in accordance with the principles of the present invention; and FIG. 2 is a cross-sectional view of the housing taken along line 2—2 of FIG. 1.

DETAILED DESCRIPTION OF THE PREFERRED EMBODIMENTS

While the present invention is susceptible of embodiment in various forms, there is shown in the drawings and will hereinafter be described a presently preferred embodiment and method with the understanding that the present disclosure is to be considered an exemplification of the invention and is not intended to limit the invention to the specific embodiment illustrated and method described.

Referring now to the figures, and in particular to FIG. 1, there is shown an exemplary combustion chamber housing 10 that is used in an automobile airbag deployment system or assembly. The housing 10 includes a main body portion 12 having a plurality of step-wise expanding regions 14, 16, 18, 20. The end 22 of the housing 10 that lies adjacent to the largest cross-sectional area or expanded region 20 is open and defines an edge 24. The opposing end 26 of the housing 10 that lies adjacent to the smallest cross-sectional area 14 of the housing 10 is formed with an inwardly extending wall 28 that occludes the end of the housing 10 and defines an opening 30 in the center thereof, generally concentric with the body portion 12. The housing further includes at least one, and preferably a plurality of through wall openings 29 therein, positioned along the housing 10 intermediate the edge 24 and the opposing end 26. The housing is mounted to other components or assemblies of the airbag deployment system at about the expanded region 20.

The housing 10 defines a chamber 32 that is configured to store combustion chemicals prior to ignition thereof, and to contain and isolate the explosion or combustion within the chamber 32. Combustion gases are expelled from the chamber 32, through the openings 29 in the housing 10 to inflate or deploy the airbag.

The exemplary housing 10 is formed in a cold drawing process. That is, strip or sheet steel is elongated or stretched generally perpendicular to the plane of the strip or sheet, longitudinally and radially in order to achieve the desired characteristics and dimensions of the housing 10. A typical housing 10 will be formed from relatively common carbon steel materials, such as AISI 1006 to 1008. Those skilled in the art will recognize that the specific AISI designations provide ranges and limitations for the amount of carbon, phosphorous, sulfur and other elements that can be in the carbon steel material.

Those skilled in the art will also recognize that working with such carbon steel materials can severely affect the grain structure of the material. Particularly, in cold drawing the combustion chamber housing 10, the otherwise relatively round grain structure of the steel tends to both increase in size and elongate in the direction of drawing. It has been observed, and will be described in more detail below relative to testing, that the elongated grain structure exhibits anisotropic characteristics in that the strength of the material is generally maintained transverse to the direction of grain elongation, however, the strength is severely reduced in the direction of elongation of the grain structure.

As a result of the weakened, elongated grain structure, during impact testing, the housings have exhibited failure as manifested by cracks that propagate from the housing edge longitudinally along the body. As provided above, machining the housings at their respective edges has helped to reduce the failure rate of the combustion chambers. However, machining can be a labor-intensive process that adds significantly to the overall cost of the combustion chamber.

In order to reduce the overall costs of the combustion chamber while increasing the strength of the housing 10 to insure structural integrity, it has been found that heat treating a portion of the housing 10, adjacent to the edge 24 and extending longitudinally therefrom, as indicated at 34, reforms or re-crystallizes the elongated grain structure that results from cold drawing. That is, in heat treating the combustion chamber housing 10, the grains are reformed into a shape and size that is similar to the pre-worked, generally rounded structure.

Referring to FIG. 1, the exemplary housing 10 is shown having a sidewall thickness $T_s$ of about 0.062 gauge, generally throughout. The widest section of the housing, the expanded region 20, has a length of about 0.92 inches and an inside diameter of about 1.24 inches. The next adjacent section, or the first intermediate section 18 has a length of about 0.50 inches and an inside diameter of about 1.10 inches. In a current embodiment, the gas discharge openings 29 are formed in the first intermediate section 18. The second intermediate section 16 has a length of about 1.18 inches and an inside diameter of about 1.03 inches. The terminal end section 14, adjacent to the end wall 28, has a length of about 0.33 inches and an inside diameter of about 0.875 inches.

The nature of the particular part dictates fabrication tolerances that are relatively stringent. For example, the inside diameter of the expanded region 20 has a tolerance of +/−0.003 inches. Likewise, the wall thickness $T_s$ has a tolerance of between +/−0.007 to 0.009 inches. As will be recognized, these stringent tolerances must be met in order to ensure the integrity of the combustion chamber housing 10 and to ensure proper fit of the housing 10 to the other airbag system components during assembly.

It has been observed that although heat treating the combustion chamber housing 10 increases the strength and reduces the tendency for crack propagation along the grain boundaries, it also results in deformation of the part such that the specific dimensions and tolerances cannot be met. Nevertheless, heat treating the housing 10 provides desirable crack-resistant properties. As such, it has been observed that a portion of the combustion chamber housing 10 can be heat treated such that the beneficial characteristics of heat treating are achieved, while at the same time maintaining the required dimensions and tolerances of the combustion chamber housing 10.

In particular, it has been found that the widest portion of the combustion chamber, the expanded region 20, adjacent to the edge 24, can be heat treated to achieve the desired strengthening characteristics, while maintaining the overall dimensions and tolerances of the housing 10. It has also been observed that a forward-most portion of the expanded region as indicated at 34 (about ⅓ to ½ of the total length of the expanded region 20) can be heat treated to affect the desired properties, while maintaining the housing 10 within the necessary dimensions and tolerances.

It is contemplated that the portion 34 of the chamber housing 10 can be heat treated using a number of known heat treating techniques such as flame heating, induction heating and the like. Those skilled in the art will recognize that typically, re-crystallization of the grain structure begins to occur between about 1100° F. and about 1300° F. In a preferred method for heat treating the chamber housing 10, a heat induction process is used in which the portion 34 of the housing 10 is heated to between about 1500° F. and about 1700° F., and most preferably about 1650° F., for a relatively short period of time. It has been observed that a period of time sufficient to reform and recrystalize the grain structure is between about 3 seconds and about 8 seconds, and most preferably between about 4 seconds and about 6 seconds at the above-noted 1650° F. temperature. In addition, induction heating is preferred because it has been found that the housing 10 can be substantially, circumferentially evenly heated. Moreover, induction heating is desirable because it creates compression stresses in the material which further tend to reduce crack propagation.

It has also been observed that chamber housings 10 that have been heat-treated in accordance with the present invention do not require further manufacturing or finishing processes, such as machining. That is, after the housings 10 are cold drawn and the edges are trimmed, the partial heat treating process provided herein is sufficient for completing fabrication of the combustion chamber housings 10. As such, a considerable amount of time and labor costs are saved by eliminating any subsequent machining steps that could otherwise be necessary.

In addition to the increased strength characteristics noted above, other advantages are contemplated by use of the partial heat treating process. Specifically, a contemplated housing 10 can have a reduced wall thickness $T_s$ from the presently used 0.062 gauge to about 0.05 gauge. It will be readily apparent that reducing the wall thickness $T_s$ of the combustion chamber housing 10 provides a number of advantages. First, the material costs can be reduced because less material is necessary to fabricate the thinner walled housing. Second, the reduced wall thickness permits the use of less heavy pressing processes which can, in turn, increase the production rate of the housings. In addition, a contemplated housing can use materials other than the presently used AISI 1006 to 1008. For example, a contemplated housing fabricated in accordance with the present invention can use materials in a range of AISI 1005–1015.

In a most preferred process, a heat induction apparatus, such as an assembly of heat induction coils is maintained a consistent distance from the sidewall of the housing 10 during heating. This can be accomplished by providing a stationary heat induction apparatus and rotating the housing 10 along its longitudinal axis A as it is being heated within the apparatus. Other methods of heating the housing 10 and preferably evenly heating the housing 10 will be recognized by those skilled in the art.

Various specimens or samples of housings were subjected to testing under controlled conditions. The samples were tested in a standard Izod Charpy Impact Testing Apparatus using a 30 pound weight positioned on a pendulum. Eighteen samples were tested. Samples 1–3 were neither machined nor heat treated. Samples 4–6 had the housing edges trimmed and machined, but not heat treated. Samples 7–9 had the housing edges heat treated, but not machined. Heat treatment of the edges of samples 7–9 was at about 1650° F. for a period of about 4 seconds. The samples were then allowed to air cool. For purposes of testing, each of the samples (1–9) was first cooled to about −40° F. in an isolated cooling chamber positioned over the Charpy test apparatus sample mount. The cooling chamber was then removed, and the impact tests conducted.

Table 1 below shows the results of the impact testing.

TABLE 1

Impact Test Results For Unfinished, Machined And Heat Treated Combustion Chambers

| SAMPLE NO. | TREATMENT | APPARATUS RESULT[1] | PHYSICAL SPECIMEN CONDITION |
|---|---|---|---|
| 1 | none | 1.6 | cracked |
| 2 | none | 1.4 | cracked |
| 3 | none | 1.4 | cracked |
| 4 | Machined Edge | 2.6 | cracked |
| 5 | Machined Edge | 1.9 | cracked |
| 6 | Machined Edge | 1.9 | cracked |
| 7 | Heat Treated | 3.8 | no cracks |
| 8 | Heat Treated | 4.0 | no cracks |
| 9 | Heat Treated | 3.8 | no cracks |

[1]The apparatus result was the energy, in foot-pounds, absorbed by the tested housing sample as a result of striking by the weight mounted to the pendulum. The result was indicated on the apparatus and was represented by the height or angle of the pendulum's back-swing after striking the sample. The apparatus results as noted are a linear function.

As can be seen from Table 1, the samples that were heat treated exhibited substantially better crack resistant properties than those that were neither heat treated nor machined along the edge. Of the three samples (7–9) that were heat treated, none exhibited any cracking at the edge as a result of impact testing. On the other hand, of the samples that were machined only (samples 4–6), all samples exhibited some cracking at the edge. Of the samples that were neither machined nor heat treated (samples 1–3), again, all of the samples exhibited cracking along the edge as a result of impact testing. Although the samples having machined edges exhibited some increase in crack resistance, the results of the testing clearly indicate that machining alone does not provide the crack resistance of the heat treatment process and housings 10 formed thereby, of the present invention.

A second group of samples (samples 10–18) were tested under conditions similar to the testing of samples 1–9. The samples were heat treated and cooled using different processes, e.g., different heating and cooling durations, in order to determine whether any particular heat treating and cooling process provided optimum results. The first set of samples, namely samples 10–12, were heat treated for 4 seconds and subsequently cooled in water or water quenched. The second set of samples, namely samples 13–15, were heat treated for 6 seconds and were allowed to air cool. The last set of samples, samples 16–18, were heat treated for 6 seconds and were subsequently water quenched. Again, for purposes of impact testing, prior to testing the samples were cooled to −40° F. as described above. The results of this testing are shown in Table 2 below.

TABLE 2

Impact Test Results For Various Heat Treatment and Cooling Processes

| SAMPLE NO. | TREATMENT | APPARATUS RESULTS[2] | PHYSICAL SPECIMEN CONDITION |
|---|---|---|---|
| 10 | 4 sec. heat treated-water quenched | 4.0 | no cracks |
| 11 | 4 sec. heat treated-water quenched | 4.0 | no cracks |
| 12 | 4 sec. heat treated-water quenched | 2.8 | cracked |
| 13 | 6 sec. heat treated-air cooled | 3.4 | no cracks |
| 14 | 6 sec. heat treated-air | 3.6 | no cracks |

TABLE 2-continued

Impact Test Results For Various Heat Treatment and Cooling Processes

| SAMPLE NO. | TREATMENT | APPARATUS RESULTS[2] | PHYSICAL SPECIMEN CONDITION |
|---|---|---|---|
| | cooled | | |
| 15 | 6 sec. heat treated-air cooled | 3.2 | no cracks |
| 16 | 6 sec. heat treated-water quenched | 3.0 | no cracks |
| 17 | 6 sec. heat treated-water quenched | 2.8 | no cracks |
| 18 | 6 sec. heat treated-water quenched | 3.2 | no cracks |

[2]The apparatus result was the energy, in foot-pounds, absorbed by the tested housing sample as a result of striking by the weight mounted to the pendulum. The result was indicated on the apparatus and was represented by the height or angle of the pendulum's back-swing after striking the sample. The apparatus results as noted are a linear function.

As can be seen from the results of Table 2, all of the heat treated samples exhibits significantly increased crack resistance as compared to the non-heat treated and machined samples. One sample that was heat treated for 4 seconds and subsequently water quenched did exhibit a crack at the edge. However, none of the other samples, whether heat treated at 4 seconds or 6 seconds or air cooled or water quenched, exhibited any cracking.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A combustion chamber housing for use in an airbag deployment system, comprising a tubular body portion having a length and having a longitudinal axis, the body portion being formed from carbon steel and defining a combustion chamber adapted to contain combustion materials and to contain gases produced by combustion thereof, the body having a first expanded region having an edge defining an opening, the edge and a portion of the body adjacent to the edge and extending longitudinally along the body being heat-treated and defining a heat-treated, strengthened region, the body having a substantially constant wall thickness throughout.

2. The combustion chamber housing in accordance with claim 1 wherein the body portion includes a plurality of expanding regions, and wherein a largest of the expanding regions defines the first expanded region, and wherein the heat-treated, strengthened region is coextensive with the first expanded region.

3. The combustion chamber housing in accordance with claim 2 wherein the heat-treated, strengthened region extends longitudinally along the body from the edge, and has a length that is smaller than a length of the first expanded region.

4. The combustion chamber housing in accordance with claim 1 wherein the heat-treated, strengthened region extends less than about ⅓ of the length of the body portion.

5. The combustion chamber housing in accordance with claim 1 wherein the heat-treated, strengthened region is formed by heat induction.

6. The combustion chamber housing in accordance with claim 1 wherein the body portion includes at least one gas discharge opening therein spaced from the edge.

7. The combustion chamber housing in accordance with claim 1 wherein the carbon steel has an AISI designation of about AISI 1005 to 1015.

* * * * *